United States Patent [19]

Schnitzius

[11] 4,118,131
[45] Oct. 3, 1978

[54] PNEUMATIC SPRING

[75] Inventor: Klaus Schnitzius, Rheinbrohl, Fed. Rep. of Germany

[73] Assignee: Stabilus GmbH, Koblenz-Neuendorf, Fed. Rep. of Germany

[21] Appl. No.: 672,654

[22] Filed: Apr. 1, 1976

[30] Foreign Application Priority Data

Apr. 12, 1975 [DE] Fed. Rep. of Germany ... 7511515[U]

[51] Int. Cl.² ............................................. F16C 11/06
[52] U.S. Cl. ..................................... 403/24; 403/141; 403/316; 267/120; 296/56; 200/61.62
[58] Field of Search .................. 403/56, 77, 141, 143, 403/133, 122, 315, 316, 24, 287; 296/56; 200/61.62; 267/120

[56] References Cited

U.S. PATENT DOCUMENTS

| 3,224,801 | 12/1965 | Price-Stephens et al. | 403/122 |
| 3,503,640 | 3/1970 | Eberle | 403/122 |
| 3,759,555 | 9/1973 | Ito | 403/122 |
| 3,919,509 | 11/1975 | Schnitzius | 200/61.62 |

FOREIGN PATENT DOCUMENTS

| 1,246,333 | 8/1967 | Fed. Rep. of Germany | 403/143 |
| 167,160 | 5/1959 | Sweden | 403/141 |
| 1,275,185 | 5/1972 | United Kingdom | 403/56 |
| 990,056 | 4/1965 | United Kingdom | 403/133 |

*Primary Examiner*—Andrew V. Kundrat
*Attorney, Agent, or Firm*—Hans Berman

[57] ABSTRACT

A pneumatic spring conductively connecting a heater on the window pane in the tail gate of a station wagon to a battery is mounted between ball-and-socket joints whose plastic socket parts are equipped with barbs permitting insertion of the ball part without tools, but preventing accidental release.

12 Claims, 8 Drawing Figures

PNEUMATIC SPRING

This invention relates to pneumatic springs, and particularly to springs hingedly fastened to supporting elements.

It its more specific aspect, this invention is concerned with improvements in the electrically conductive pneumatic spring disclosed and claimed in my earlier U.S. Pat. No. 3,919,509. The earlier spring was proved with insulating eyes on its piston rod and cylinder permitting pivotal movement about axes fixed relative to the elements supporting the spring. It has been found that a universal joint is preferable for connecting a pneumatic spring of the type described to a support, and it is a primary object of this invention to provide a pneumatic spring with a universal joint attachment which can be made and installed in a simple manner at low cost.

With this object and others in view, as will hereinafter become apparent, the invention resides in a pneumatic spring arrangement including a spring cylinder member having an axis and formed with a cavity. A spring piston assembly includes a spring piston rod member axially projecting from the cavity. Fastening devices fasten each of the spring members to an associated supporting member.

At least one of the fastening devices includes a ball-and-socket joint having a ball part and a socket part. One of the parts is attached to the associated spring member while the other part is adapted to be fastened to the associated supporting member. The socket part is a unitary piece of material which includes a resiliently deformable barblike portion permitting insertion of the ball part into the socket part by applied pressure of a predetermined magnitude, but preventing withdrawal of the ball part by a force of the same magnitude.

Other features, additional objects, and many of the attendant advantages of this invention will readily be appreciated as the same becomes better understood by reference to the following detailed description of preferred embodiments when considered in connection with the appended drawing in which.

Figure 8:
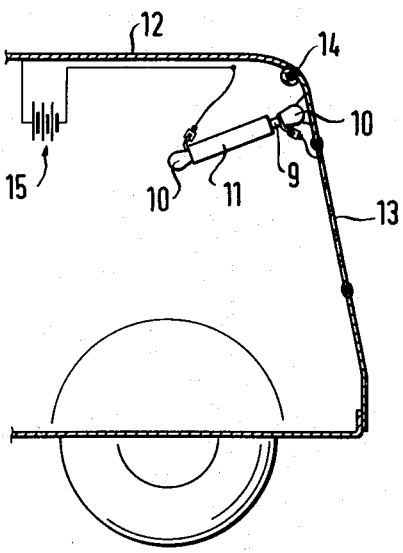
FIG. 8 is a simplified, fragmentary view of a station wagon equipped with a hydropneumatic spring according to this invention.
Figure 3:
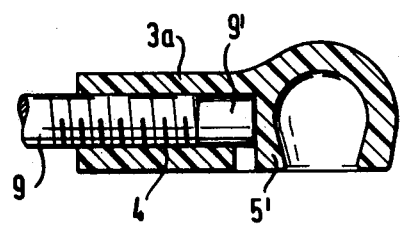
FIGS. 3 and 4 show a modification of the socket part in the joint assembly of FIGS. 1 and 2 in corresponding views.

Referring now to the drawing in detail, and initially to FIG. 8, almost identical with FIG. 3 in the aforementioned earlier patent, there is seen a pneumatic spring whose cylinder 11 is attached to the metallic body 12 of a station wagon by a ball-and-socket joint 10. The piston rod 9 axially projecting from the cavity of the cylinder 11 is the only visible element of the basically conventional piston assembly of the spring. A ball-and-socket joint 10, not significantly different from the joint connecting the cylinder 11 to the supporting car body 12, secures the piston rod 9 to the tail gate 13 of the station wagon. Hinges 14 pivotally fasten the tail gate 13 to the car body 12.

As is explained in more detail in the afore-mentioned patent, the window in the tail gate 13 is provided with an electric heater to prevent fogging, and the energizing current for the heater is supplied from a battery 15 on the car body 12 by a conductive path including the pneumatic spring 9, 11. A ground connection through the gate 13, hinge 14, and body 12 provides the conductive return path between the heater and the battery 15. In such an arrangement, the pneumatic spring must be installed from the supporting car body 12 and tail gate 13, and this invention is concerned with the mechanical connection between the electrically insulated members.

Figure 1:
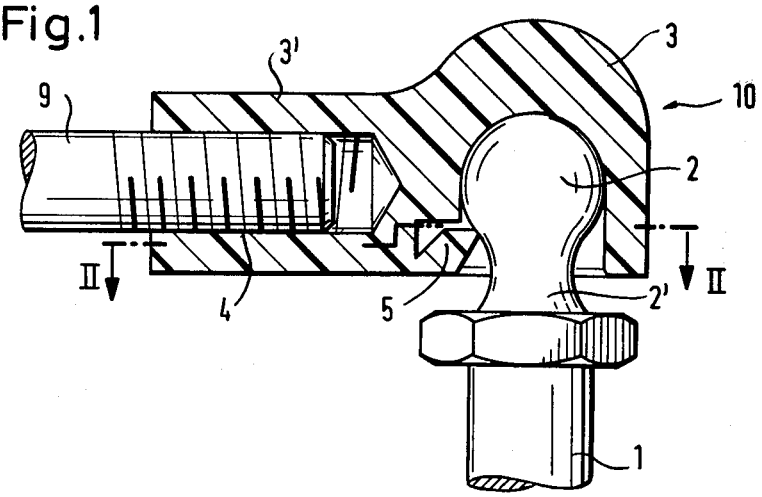
FIG. 1 shows a ball-and-socket joint and immediately associated elements of an improved pneumatic spring of the invention in section through the center of rotation of the joint.
Figure 2:
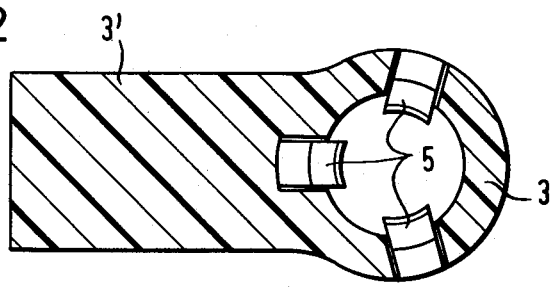
FIG. 2 illustrates the device of FIG. 1 in section on the line II—II.

A universal joint 10 connecting the pneumatic spring 9, 11 with the tail gate 13 is illustrated in FIGS. 1 and 2. The socket member of the joint is a unitary piece of molded, thermoplastic, synthetic resin composition, such as sparingly plasticized polyvinyl chloride. The socket member has a cup-shaped portion 3 in whose cavity the metallic ball part 2 of the joint is rotatably received. A neck portion 2' of reduced cross section connects the spherically arcuate head of the ball part to a pin 1 threadedly attached to the tail gate 13 in a conventional manner, not specifically shown.

A mounting portion 3' extends radially away from the cup-shaped portion 3, and the two portions jointly constitute the body of the socket part. A blind bore in the mounting portion 3' is threaded about an axis radial relative to the cup-shaped portion 3, and its threads 4 matingly receive the threaded end of the piston rod 9. It will be understood that a threaded stud coaxially projecting from the closed end wall of the cylinder 11 is attached to the identical socket part of the other ball joint 10 in the same manner for connection to the car body 12.

Three lugs 5, integrally molded with the cup-shaped portion 3 but more resilient because of their reduced cross section, project into the opening of the socket cavity and may be deflected by the ball part 2 during insertion of the latter into the socket part. After passage of the ball part 2 through the restricted opening of the cup-shaped portion 3, the relaxing lugs 5 engage the neck portion 2' from three radial directions equiangularly spaced about the axis of the pin 1. They function as barbs which prevent accidental withdrawal of the ball part 2 from the socket part, a force much greater than the inserting force being required suitably to deflect the lugs 5 for withdrawal of the ball part 2.

A single lug 5 may not by itself offer sufficient resistance to accidental separation of the ball part from the socket part of the afore-described joint, but the modified ball-and-socket joints shown in FIGS. 3 to 7 operate satisfactorily with a single lug or barb 5' which is suitably backed in its ball retaining position.

Figure 4:
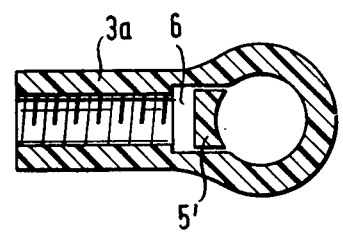

As is shown in FIGS. 3 and 4, the body portion 3a of the illustrated socket part has a recess 6 permitting the lug 5' to pivot from its normal position so as to pass the head portion 2 of the ball part, not itself shown in FIGS. 3 to 7. The recess 6 communicates with the terminal portion of the bore whose threads 4 receive the piston rod 9. A smooth, reduced end portion 9' of the latter may thus be screwed into the body 3a to back the lug 5' and to prevent its pivotal movement from the ball blocking position shown in FIG. 3 in which the lug 5' prevents insertion of the ball head 2 and withdrawal of the non-illustrated inserted head.

Figure 5:
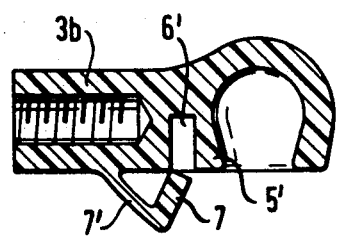
FIGS. 5 and 6 illustrate additional variations of the socket part in the joint assembly of FIG. 1 in corresponding sections.
Figure 6:
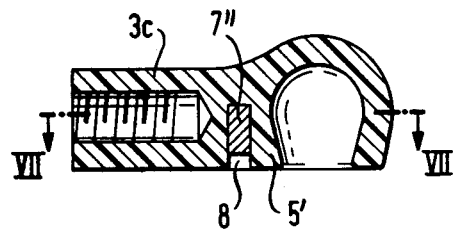
Figure 7:
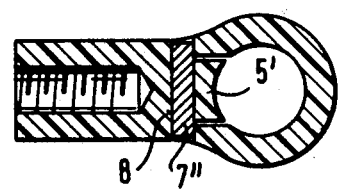
FIG. 7 illustrates the device of FIG. 6 in section on the line VII—VII.

In the devices shown in FIGS. 5 to 7, the bore of the body portion 3b, 3c receiving the piston rod 9 is blind. In the body portion 3b illustrated in FIG. 5, there is provided a recess 6' contiguously adjacent the lug 5' and offset from the lug in a direction away from the inserted ball part, not itself seen. The recess 6' is open in a downward direction, as viewed in FIG. 5, but closed in all other directions. As long as the recess 6' is empty, the lug 5' may recede under the pressure of a ball part being inserted into or being withdrawn from the cup of the body portion 3b. A plug 7 approximately equal in shape and dimensions to the recess 6' is integrally attached to the body portion 3a by a stem 7' thin enough to flex when the plug 7 is inserted manually into the recess 6' to prevent pivotal movement of the lug 5' out of the orifice of the cup in the body portion 3b.

The body portion 3c illustrated in FIGS. 6 and 7 is formed with a transverse slot 8 bounded by the lug 5' but extending beyond the lug in the plane of FIG. 7. A metal bar 7" manually inserted into the slot 8 may back the lug 5' in the same manner as described above with reference to the synthetic polymer plug 7.

It will normally be convenient to use identical ball-and-socket joints on both external members 9, 11 of the same pneumatic spring 10, but two different ball-and-socket joints may be combined if convenient, and a universal joint may be needed on only one member of the spring. In all detailed illustrations of such joints, the socket part is shown herein to be attached to the spring, and the ball part to be attached to the supporting structure, but the joint parts may be interchanged in an obvious manner.

If the pneumatic spring is used with a tail gate not equipped with an electric heater in the manner described in the earlier patent, insulation may not be required, and the socket part of the ball joint may be made of electrically conductive material. Soft aluminum alloys are readily diecast in the shapes of the socket parts described above and may be assembled by flexing barb-like lugs, and by backing the relatively thin lugs in the manner described.

It should be understood, therefore, that the foregoing description relates only to presently preferred embodiments of the invention, and that it is in intended to cover all changes and variations in the examples of the invention herein chosen for the purpose of the disclosure which do not constitute departures from the spirit and scope of the invention set forth in the appended claims.

What is claimed is:

1. In a pneumatic spring arrangement including a spring cylinder element having an axis and formed with a cavity therein; a piston assembly movably received in said cavity and including a spring piston-rod element axially projecting from said cavity; and fastening means for fastening each of said spring elements to an associated support element, one of said fastening means including a ball-and-socket joint having a ball part and a socket part, one of said parts being attached to the associated spring element, and the other part being adapted to be fastened to the associating supporting element, the improvement in said ball-and-socket joint which comprises:

(a) said socket part including a body portion formed with a cavity and barb means permitting insertion of said ball part into said cavity by applied pressure of predetermined magnitude, but preventing withdrawal of said ball part by a force of said predetermined magnitude;

(b) said body portion being formed with a recess and being internally threaded in said recess;

(c) said barb means including a lug portion separating said recess from said cavity and flexibly connected to said body portion for movement inward and outward of said cavity while simultaneously moving outward and inward of said recess respectively;

(d) said ball part having a spherically arcuate head portion releasably received in said cavity and a neck portion of reduced diameter partly received in said cavity and projecting from said head portion outward of said cavity;

(e) one of said spring elements being associated with said socket part and including an externally threaded portion releasably and mattingly received in said recess in abutting engagement with said lug portion, said threaded portion limiting movement of said lug portion outward of said cavity and inward of said recess from a position of engagement with said neck portion.

2. In an arrangement as set forth in claim 1, said body portion and said lug portion jointly constituting a unitary piece of material, said lug portion being connected to said body portion for pivotal movement inward of said cavity and outward of said recess under the pressure of the backing member received in said recess, and for pivotal movement outward of said cavity and inward of said recess under the pressure of the head portion being withdrawn from said cavity while said backing member is released from said recess.

3. In an arrangement as set forth in claim 2, wherein said material being a synthetic resin composition.

4. In an arrangement as set forth in claim 3, said socket part being attached to one of said spring elements.

5. In an arrangement as set forth in claim 4, said one spring elements being said spring piston rod elements.

6. In a pneumatic spring arrangement including a spring cylinder element having an axis and formed with a cavity therein; a piston assembly movably received in said cavity and including a spring piston rod element axially projecting from said cavity; and fastening means for fastening each of said spring elements to an associated supporting element, one of said fastening means including a ball-and-socket joint having a ball part and a socket part, one of said parts being attached to the associated spring element the other part being adapted to be fastened to the associated supporting element, the improvement in said ball-and-socket joint which comprises:

(a) said socket part including a body portion formed with a cavity and barb means permitting insertion of said ball part into said cavity by applied pressure of predetermined magnitude, but preventing withdrawal of said ball part by a force of said predetermined magnitude.

(b) said barb means including a backing and a lug portion flexibly connected to said body portion, said lug portion bounding said cavity, (c) said ball part having a spherically arcuate head portion releasably received in said cavity and a neck portion of reduced diameter partly received in said cavity and projecting from said head portion outward of said cavity, (d) said body portion being formed with a recess contiguously adjacent said lug portion and extending from said lug portion in a direction away from said neck portion, (e) said backing member being integrally connected to said body portion for movement into and out of said recess, (f) said backing member, when received in said recess, holding said lug portion engaged with said neck portion.

7. In an arrangement as set forth in claim 6, wherein said body portion, said lug portion, and said backing member being respective integral portions of a unitary body of electrically insulating plastic.

8. In a pneumatic spring arrangement including a spring cylinder element having an axis and formed with a cavity therein; a piston assembly movably received in said cavity and including a spring piston rod element axially projecting from said cavity; and fastening means for fastening each of said spring elements to an associated supporting element, one of said fastening means including a ball-and-socket joint having a ball part and a socket part, one of said parts being attached to the associated spring element, the other part being adapted to be fastened to the associated supporting element, the improvement in said ball-and-socket joint which comprises:

(a) said socket part including a mounting portion and a body portion;

(b) said body portion being formed with a cavity and including barb means permitting insertion of said ball part into said cavity by applied pressure of predetermined magnitude, (c) said barb means including a lug portion of said body portion flexibly movable inward and outward of said cavity;

(d) said ball part having a spherically arcuate head portion releasably received in said cavity and a neck portion of reduced diameter partly received in said cavity and projecting from said head portion outward of said cavity, (e) said socket part being formed with a recess contiguously adjacent to said lug portion and partly separating said mounting portion from said body portion;

(f) a backing member releasably received in said recess and holding said lug portion engaged with said neck portion; and (g) attaching means on said mounting portion for attaching the amounting portion to one of said elements.

9. In an arrangement as set forth in claim 8, said mounting portion being elongated in a direction away from said body portion.

10. In an arrangement as set forth in claim 9, said recess being elongated transversely to the direction of elongation of said mounting portion and dimensioned for receiving said backing member, no portion of the received backing member extending outward of said recess.

11. In an arrangement as set forth in claim 9, said backing member being received in said recess for linear sliding movement transversely to the direction of elongation of said mounting portion.

12. In an arrangement as set forth in claim 8, said mounting portion, and said lug portion jointly constituting a unitary body of electrically insulating material.

* * * * *